United States Patent
Rakshit (10) Patent No.: US 11,295,309 B2
(45) Date of Patent: Apr. 5, 2022

(54) EYE CONTACT BASED FINANCIAL TRANSACTION

(71) Applicant: International Business Machines Corporation, Armonk, NY (US)

(72) Inventor: Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 122 days.

(21) Appl. No.: 16/569,758

(22) Filed: Sep. 13, 2019

(65) Prior Publication Data

US 2021/0081952 A1 Mar. 18, 2021

(51) Int. Cl.
*G06Q 20/40* (2012.01)
*G06F 3/01* (2006.01)
*H04N 7/14* (2006.01)

(52) U.S. Cl.
CPC ....... *G06Q 20/40145* (2013.01); *G06F 3/013* (2013.01); *H04N 7/141* (2013.01)

(58) Field of Classification Search
None
See application file for complete search history.

(56) References Cited

U.S. PATENT DOCUMENTS

| | | | |
|---|---|---|---|
| 9,658,689 B2 | 5/2017 | Bedell, Jr. | |
| 10,149,958 B1 * | 12/2018 | Tran | G16H 20/30 |
| 10,223,710 B2 * | 3/2019 | Purves | G06Q 30/0631 |
| 10,335,572 B1 * | 7/2019 | Kumar | A61H 9/0078 |
| 10,359,648 B2 * | 7/2019 | Kim | G02C 7/04 |
| 10,469,769 B1 * | 11/2019 | Mukherjee | G06T 11/60 |
| 10,492,981 B1 * | 12/2019 | Kumar | G06F 3/167 |
| 10,685,488 B1 * | 6/2020 | Kumar | G06F 3/017 |

(Continued)

FOREIGN PATENT DOCUMENTS

IN 201841020740 A 10/2018

OTHER PUBLICATIONS

Jelle De Smet. "The smart contact lens: from an artificial iris to a contact lens display". PhD Dissertation. University of Ghent. (2014). http://hdl.handle.net/1854/LU-4305978 (Year: 2014).*

(Continued)

*Primary Examiner* — Narayanswamy Subramanian
*Assistant Examiner* — Ayal I. Sharon
(74) *Attorney, Agent, or Firm* — Joseph P. Curcuru (57) ABSTRACT

Embodiments describe an approach for smart lens-based transactions using eye contact. Embodiments comprise identifying a focus angle of a user wearing a smart lens, determining a smart lens-based transaction is occurring based on the focus angle including a second user or a point of sale sensor for a predetermined amount of time, and verifying the focus angle overlaps with a transacting focus angle of the second user or the point of sale sensor. Additionally, embodiments comprise authenticating the user based on biometric security measures on the smart lens, displaying an augmented reality prompt to the user on the smart lens, wherein the augmented reality prompt on the smart lens prompts the user to select a stored payment method and confirm an amount or file associated with the smart lens-based computing event, and executing the smart lens-based transaction based on the verified overlapping focus angles and the user confirmation.

9 Claims, 3 Drawing Sheets

(56) References Cited

U.S. PATENT DOCUMENTS

| | | | | |
|---|---|---|---|---|
| 10,838,239 | B2* | 11/2020 | Owens | H02J 50/10 |
| 10,895,762 | B2* | 1/2021 | Owens | H02J 50/80 |
| 2002/0131622 | A1* | 9/2002 | Lee | G06K 9/00604 |
| | | | | 382/106 |
| 2004/0027536 | A1* | 2/2004 | Blum | G02C 7/08 |
| | | | | 351/159.03 |
| 2009/0256904 | A1* | 10/2009 | Krill | G06F 3/013 |
| | | | | 348/47 |
| 2010/0149073 | A1* | 6/2010 | Chaum | G02B 27/0172 |
| | | | | 345/8 |
| 2011/0227741 | A1* | 9/2011 | Jeon | G08B 25/016 |
| | | | | 340/573.1 |
| 2014/0372211 | A1* | 12/2014 | Kritt | G06Q 30/0251 |
| | | | | 705/14.49 |
| 2015/0073907 | A1* | 3/2015 | Purves | G06Q 20/384 |
| | | | | 705/14.58 |
| 2016/0005229 | A1* | 1/2016 | Lee | G06F 3/0488 |
| | | | | 345/419 |
| 2016/0007849 | A1* | 1/2016 | Krueger | A61B 5/398 |
| | | | | 600/301 |
| 2016/0253651 | A1* | 9/2016 | Park | G07F 9/023 |
| | | | | 705/39 |
| 2016/0262608 | A1* | 9/2016 | Krueger | G06T 19/006 |
| 2016/0299569 | A1* | 10/2016 | Fisher | G02B 27/0172 |
| 2017/0023793 | A1* | 1/2017 | Shtukater | H04N 13/344 |
| 2017/0091745 | A1 | 3/2017 | Castinado | |
| 2017/0092007 | A1* | 3/2017 | Goldberg | G06K 9/0061 |
| 2017/0108918 | A1* | 4/2017 | Boesen | G06F 1/163 |
| 2017/0116657 | A1* | 4/2017 | Oh | G06F 3/013 |
| 2017/0199377 | A1* | 7/2017 | Ekambaram | G02B 27/0101 |
| 2017/0235931 | A1* | 8/2017 | Publicover | G06F 3/012 |
| 2017/0262961 | A1* | 9/2017 | Ekambaram | G09G 5/346 |
| 2017/0270636 | A1* | 9/2017 | Shtukater | G06F 3/012 |
| 2017/0312614 | A1* | 11/2017 | Tran | A61B 5/11 |
| 2017/0323481 | A1* | 11/2017 | Tran | G06K 9/00771 |
| 2018/0373026 | A1* | 12/2018 | Yi | G02B 27/0172 |
| 2019/0004325 | A1* | 1/2019 | Connor | G02B 27/0172 |
| 2019/0089769 | A1 | 3/2019 | Rakshit | |
| 2019/0179165 | A1* | 6/2019 | Shtukater | G02B 27/0093 |
| 2019/0266906 | A1* | 8/2019 | Lewis | G06N 5/04 |
| 2019/0331937 | A1* | 10/2019 | Owens | G02C 11/10 |
| 2019/0331938 | A1* | 10/2019 | Owens | H01F 38/14 |
| 2019/0332168 | A1* | 10/2019 | Weldemariam | A61B 5/6821 |
| 2020/0020165 | A1* | 1/2020 | Tran | G06N 7/005 |
| 2020/0026097 | A1* | 1/2020 | Pinel | A61B 3/14 |
| 2020/0068188 | A1* | 2/2020 | Maeda | G06T 19/00 |
| 2020/0110946 | A1* | 4/2020 | Kline | H04N 5/23206 |
| 2020/0142942 | A1* | 5/2020 | Peri | H04L 65/1059 |
| 2020/0160704 | A1* | 5/2020 | Choi | G08G 1/0112 |
| 2020/0293176 | A1* | 9/2020 | Yoganandan | G06F 3/04886 |

OTHER PUBLICATIONS

Celine Vanhaverbeke et al. "Microfabrication of a spherically curved liquid crystal display enabling the integration in a smart contact lens". Displays, vol. 49, pp. 16-25 (2017). (Year: 2017).*

Jihun Park et al. "Soft, smart contact lenses with integrations of wireless circuits, glucose sensors, and displays". Science Advances, 2018;4: eaap9841 Jan. 24, 2018. (Year: 2018).*

Wikipedia "Google Glass". Printed Sep. 20, 2020. https://en.wikipedia.org/wiki/Google_Glass (Year: 2020).*

Swarna Kumari Adari. "Smart Wearable Contact Lens Based Wireless Transaction System and Method Thereof". India Application No. 201841020740 A. Oct. 26, 2018. (Year: 2018).*

"Biometrics will eliminate friction in financial services", © Finextra Research 2019, 3 pages, <Biometrics will eliminate friction in financial services>.

"Electromagnetic spectrum" Wikipedia, this page was last edited on Jul. 21, 2019, 5 pages, <https://en.wikipedia.org/wiki/Electromagnetic_spectrum>.

"How Smart contact lenses could totally change your perspective", Vision Direct, Mar. 7, 2019, 6 pages, <https://www.visiondirect.co.uk/blog/smart-contact-lenses>.

"Magnetic field", Wikipedia, this page was last chaned on May 20, 2019, 3 pages, <https://simple.wikipedia.org/wiki/Magnetic_field>.

"Smart Contact Lenses Market 2018 to 2023 Outlook | Samsung, Sony, Alcon, Google, Sensimed SA, Etc Players Counting $7.2 Bn in Terms of Revenue", Published: Aug. 14, 2018, Copyright © 2019 MarketWatch, Inc, 8 pages, <https://www.marketwatch.com/press-release/smart-contact-lenses-market-2018-to-2023-outlook-samsung-sony-alcon-google-sensimed-sa-etc-players-counting-72-bn-in-terms-of-revenue-2018-08-14>.

"What is MST?", The Official Samsung Galaxy site, printed on Jul. 25, 2019, 2 pages, <https://www.samsung.com/global/galaxy/what-is/mst/ >.

Cade, DL, "Sony Patents Contact Lens Cam with Zoom, Aperture Control, and More", Copyright © 2019 PetaPixel, 12 pages, <https://petapixel.com/2016/04/28/sony-patents-contact-lens-camera-joins-google-samsung/>.

Howarth, Fran, "Are Retailers Ready for Samsung Pay?", Using Magnetic Secure Transmission Technology to Boost Mobile Payments, Published Aug. 21, 2015, 4 pages, <https://insights.samsung.com/2015/08/21/are-retailers-ready-for-samsung-pay/ >.

Larduinat, Xavier, "3 ways biometric technology will change the face of financial services", Last updated: Jan. 2, 2018, 3 pages, <https://blog.gemalto.eom/financial-services/2018/01/02/3-ways-biometric-technology-will-change-face-financial-services/>.

Sherr, Ian, "You've heard of AR glasses, but this startup wants to make them into contact lenses", Clnet, Nov. 14, 2018, 4 pages, <https://www.cnet.com/news/youve-heard-of-ar-glasses-but-this-startup-wants-to-make-them-into-contact-lenses/>.

Tritle, Aisha, "Wearables for the Eye: Smart Contact Lenses", Omnidya AI—Medium, Dec. 18, 2018, 4 pages, <https://medium.com/omnidya-ai/wearables-for-the-eye-smart-contact-lenses-bc8bda3be83>.

Villas-Boas, Antonio, "Samsung has a key technological advantage that makes it much better to pay with your phone", Business Insider India, Sep. 24, 2015, 6 pages, <https://www.businessinsider.in/Samsung-has-a-key-technological-advantage-that-makes-it-much-better-to-pay-with-your-phone/articleshow/49083595.cms>.

Rakshit, Sarbajit, "Smart Contract Enabled Smart Contact-Based Computing", Filed Herewith, 34 pages.

* cited by examiner

EYE CONTACT BASED FINANCIAL TRANSACTION

BACKGROUND OF THE INVENTION

The present invention relates generally to the field of eye contact-based computing, and more particularly to eye contact-based transaction using smart contact lens and/or smart glasses.

An eye wearable smart contact lens can have built in electronic circuits that can be used for capturing tears sample to detect diabetic levels. Eye wearable smart contact lens can comprise cameras and augmented reality capabilities. The smart contact lens can comprise various sensors, like direction, field of view (FoV) measurement etc. Augmented reality glass or head mounted displays can project light directly to retina to create images for user's visualization, the augmented reality device can comprise or communicate with various sensors, like a direction, FoV measurement, etc. Smart contact lenses and augmented reality glasses can have magnetic secure transmission (MST) to enable transactions.

MST is an advanced technology that helps power Mobile Paying systems. MST generates a magnetic signal similar to that in traditional payment cards when swiped, providing the added convenience of being able to pay quickly on the go without having to reach for your wallet. MST then transmits that magnetic signal from a user's device to the payment terminal's card reader for further processing. Accepted at a majority of payment terminals with a card reader, MST technology is very convenient and is even more secure than traditional methods of payment card. Basically, there will be a magnetic coil circuit in the mobile device, which will be replicating the same magnetic field as an electronic card used for a final transaction, when power is transmitted, MST directs the magnetic field into the magnetic coil, and replicates an electronic payment card (e.g., debit card or credit card).

SUMMARY

Embodiments of the present invention disclose a method, a computer program product, and a system for smart lens-based transactions using eye contact, the method comprising: identifying a focus angle of a user wearing a smart lens, wherein the focus angle is a predefined angle from a gaze point of the user; determining a smart lens-based transaction is occurring based on the focus angle including a second user or a point of sale sensor for a predetermined amount of time; verifying the focus angle overlaps with a transacting focus angle of the second user or the point of sale sensor; authenticating the user based on biometric security measures on the smart lens; displaying an augmented reality prompt to the user on the smart lens, wherein the augmented reality prompt on the smart lens prompts the user to select a stored payment method and confirm an amount or file associated with the smart lens-based computing event; and executing the smart lens-based transaction based on the verified overlapping focus angles and the user confirmation.

DETAILED DESCRIPTION

In some embodiments of the present invention, when a smart eye-contact lens (i.e., smart lens) event is detected then a computing process is initiated. Examples of a smart lens include: a wearable smart contact lens, a pair of smart glasses, and/or any form of wearable smart eyewear or headwear known in the art that contains a lens. Smart lens-based computing can bring various advantages over mobile device-based computing. For example, smart lens-based computing does not require the user to hold a device or require the user to provide a voice command to complete a transaction. Some embodiments of the present invention enable the user to silently perform a transaction, and at the same time, for one or more transactions, can perform retina-based authentication to authenticate the user. A smart lens-based transaction any type of digital transaction known in the art (e.g., financial, information, etc.) between two or more parties.

As smart lens-based computing system gains popularity, there is a need to establish and ensure trust and security in smart lens-based computing. For example, enabling a proper smart lens, defining the duration of eye content required between one or more users. Some embodiments of the present invention can determine if a receiving smart lens or point of sale transaction is in the user's focus angle, wherein the focus angle can be a predefined angle from a gaze point of the user. In some embodiments of the present invention a user can also use smart lenses for social interactions, and at the same time, the smart lenses can be used for transactions, so there can be an ambiguity in the purpose of smart lens. Users include a sending party and a receiving party. The sending party are the users or point of sale (POS) sensors that are sending the money or data to the receiving party and the receiving party are the users or point of sale POS sensors that are receiving the money or data from the sending party.

Smart lens-based computing is rapidly progressing, and users require a financial transaction method that enables hands free transactions, is safe, secure, and that can determine when a transaction is taking place. Embodiments of the present invention can solve the problems stated above. Embodiments of the present invention enables hands free transactions using smart lenses, instills transactional trust between users and can determine the difference between surround people and a financial transaction.

It should be noted herein that in the described embodiments, participating parties (i.e., users) have consented to having their images taken, uploaded, and saved and being recorded and monitored. Additionally, participating parties are aware of the potential that such recording and monitoring may be taking place. Users have consented to enabling biometric authentication, monitoring, and storing. Additionally, participating parties are aware of the potential monitoring and storing of financial and transactional data. In various embodiments, for example, when downloading or operating an embodiment of the present invention, the embodiment of the invention presents a terms and conditions prompt enabling the interested parties to opt-in or opt-out of participation.

Implementation of embodiments of the invention may take a variety of forms, and exemplary implementation details are discussed subsequently with reference to the figures (i.e., FIG. 1-FIG. 3).

Figure 1:
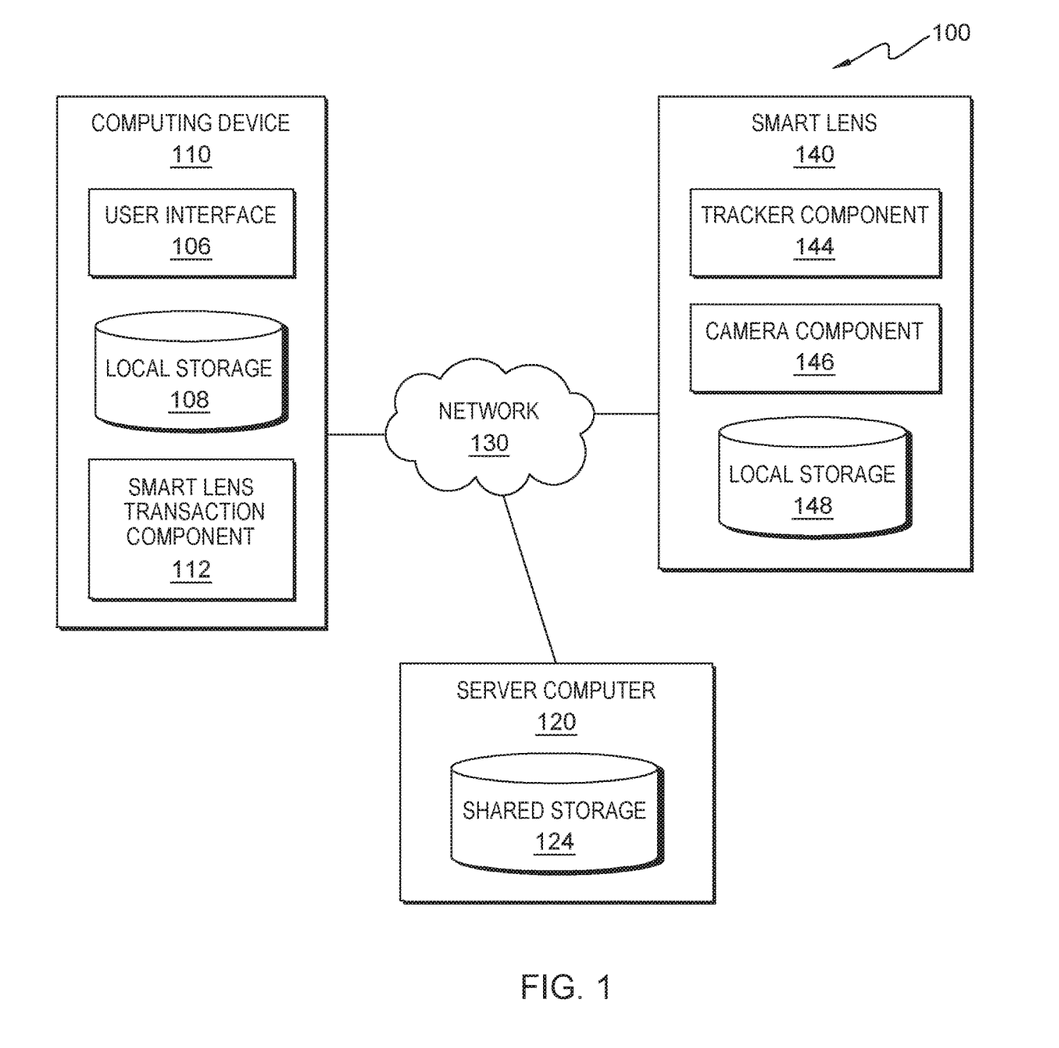
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed" as used in this specification describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims. Distributed data processing environment 100 includes computing device 110, smart lens 140, and server computer 120 interconnected over network 130.

Network 130 can be, for example, a storage area network (SAN), a telecommunications network, a local area network (LAN), a wide area network (WAN), such as the Internet, a wireless technology for exchanging data over short distances (using short-wavelength ultra-high frequency (UHF) radio waves in the industrial, scientific and medical (ISM) band from 2.4 to 2.485 GHz from fixed and mobile devices, and building personal area networks (PANs) or a combination of the three), and can include wired, wireless, or fiber optic connections. Network 130 can include one or more wired and/or wireless networks that can receive and transmit data, voice, and/or video signals, including multimedia signals that include voice, data, text and/or video information. In general, network 130 can be any combination of connections and protocols that will support communications between computing device 110, smart lens 140, and server computer 120, and any other computing devices and/or storage devices (not shown in FIG. 1) within distributed data processing environment 100.

In some embodiments of the present invention, computing device 110 can be, but is not limited to, a standalone device, a client, a server, a laptop computer, a tablet computer, a netbook computer, a personal computer (PC), a smart phone, a desktop computer, a smart television, a smart watch, a radio, a stereo system, a cloud based service (e.g., cognitive cloud based service), and/or any programmable electronic computing device capable of communicating with various components and devices within distributed data processing environment 100, via network 130 or any combination therein. In general, computing device 110 can be representative of any programmable computing device or a combination of programmable computing devices capable of executing machine-readable program instructions and communicating with users of other computing devices via network 130 and/or capable of executing machine-readable program instructions and communicating with server computer 120. In various embodiments, not depicted in FIG. 1, computing device 110 can have a camera component that is capable of recording, transmitting, and storing live or recorded videos and capable of taking, transmitting, and storing photographs. The camera component can be any type of camera known in the art.

In some embodiments of the present invention, computing device 110 can represent any programmable electronic computing device or combination of programmable electronic computing devices capable of executing machine readable program instructions, manipulating executable machine-readable instructions, and communicating with server computer 120 and other computing devices (not shown) within distributed data processing environment 100 via a network, such as network 130. Computing device 110 can include an instance of user interface (interface) 106, local storage 108, smart lens 140 and/or smart lens transaction component (smart transaction) 112. In various embodiments, not depicted in FIG. 1, computing device 110 can have a plurality of user interfaces. In other embodiments, not depicted in FIG. 1, distributed data processing environment 100 can comprise a plurality of computing devices, plurality of server computers, and/or one a plurality of networks. Computing device 110 can include internal and external hardware components, as depicted, and described in further detail with respect to FIG. 3.

User interface (interface) 106 provides an interface to smart transaction 112 on computing device 110. Computing device 110, via user interface 106, can enable a user and/or a client to interact with smart transaction 112 and/or server computer 120 in various ways, such as sending program instructions, receiving program instructions, sending and/or receiving messages, updating data, sending data, inputting data, editing data, collecting data, and/or receiving data. In one embodiment, interface 106 can be a graphical user interface (GUI) or a web user interface (WUI) and can display at least text, documents, web browser windows, user options, application interfaces, and instructions for operation. interface 106 can include information (such as graphic, text, and sound) presented to a user and control sequences the user employs to control operations. In another embodiment, interface 106 can be a mobile application software providing an interface between a user of computing device 110 and server computer 120. Mobile application software, or an "app," can be designed to run on smart phones, tablet computers and other computing devices. In an embodiment, interface 106 can enable the user of computing device 110 to at least send data, input data, edit data (annotations), collect data and/or receive data.

Server computer 120 can be a standalone computing device, a management server, a web server, a mobile computing device, one or more client servers, or any other electronic device or computing system capable of receiving, sending, and processing data. In other embodiments, server computer 120 can represent a server computing system utilizing multiple computers such as, but not limited to, a server system, such as in a cloud computing environment. In another embodiment, server computer 120 can represent a computing system utilizing clustered computers and components (e.g., database server computers, application server computers, etc.) that act as a single pool of seamless resources when accessed within distributed data processing environment 100. Server computer 120 can include internal and external hardware components, as depicted, and described in further detail with respect to FIG. 3.

Each of shared storage 124, local storage 148, and local storage 108 can be a data/knowledge repository and/or a database that can be written and/or read by one or a combination of smart transaction 112, server computer 120 and computing device 110. In the depicted embodiment, shared storage 124, local storage 148, resides on server computer 120 and local storage 108 resides on computing device 110. In another embodiment, shared storage 124, local storage 148, and/or local storage 108 can reside elsewhere within distributed data processing environment 100, provided that each can access and is accessible by computing device 110 and server computer 120. Shared storage 124, local storage 148, and/or local storage 108 can each be implemented with any type of storage device capable of storing data and configuration files that can be accessed and utilized by server computer 120, such as, but not limited to, a database server, a hard disk drive, or a flash memory.

In some embodiments of the present invention, shared storage 124, local storage 148, and/or local storage 108 can each be a hard drive, a memory card, a computer output to laser disc (cold storage), and/or any form of data storage known in the art. In some embodiments, shared storage 124, local storage 148, and/or local storage 108 can each be one or more cloud storage systems and/or databases linked to a cloud network. In various embodiments, shared storage 124, local storage 148, and/or local storage 108 can access, store, and/or house smart lens-based transaction information, and/or data shared throughout distributed data processing environment 100 (e.g., smart contract information stored on ledgers).

Smart lens 140 can be any form of one or more wearable smart contact lens, smart glasses, or any form of smart eyewear or headwear known in the art that contains a lens. In the depicted embodiment, Smart lens 140 includes tracker component (tracker) 144, camera component (camera) 146, and local storage 148. Alternatively, a smart lens comprises augmented reality capabilities, via an augmented reality component, as it is known in the art. In some embodiments, the augmented reality component can execute on computing device 110 and display on smart lens 140. Smart lens 140 of the user can communicate with computing device 110 and computing device 110 can communicate with transaction system for executing transaction.

In various embodiments, smart lens 140 can comprise an internal compass to identify the direction of focus of the eye and a compass component, not depicted in FIG. 1. Several terms may be used interchangeably to refer to the direction of focus of the eye or point of eye contact including: focus point, eye focus, eye direction, focus direction, and gaze point. The term focus angle, or field of view, describes an equal angle to each side (horizontally or vertically) of the point of eye contact. In various embodiments, tracker 144 and the compass component installed on smart lens 140 can identify the direction of focus of the eye. In various embodiments, where augmented reality capabilities are available, smart lens 140 can display augmented reality like images to a user similar to head mounted augmented reality glass. In various embodiments, the tilt sensor installed on smart lens 140 can calculate the tilting angle while making the eye contact. In various embodiments, smart lens 140 can be paired and communicate with computing device 110.

In various embodiments, smart lens 140 can comprise a magnetic coil similar to magnetic secure transmission technology, the magnetic coil can facilitate the financial transaction between the sending party and receiving party. In various embodiments, the magnetic coil on the surface of smart lens 140 can be aligned with the focus direction of a user. Tracker 144 can be a gaze point tracker that can identify the eye focus of the user along with peripheral vision, or focus angle, of the user.

Camera 146 can be one or more cameras that are known in the art. In various embodiments, camera 146 can provide live video feeds (video feed) of what the user is viewing to computing device 110 or more specifically smart transaction 112. In various embodiments, smart transaction 112 can enable smart lens 140 to store the captured video feed and/or photographs to local storage 148, shared storage 124, and/or local storage 108.

In various embodiments, smart transaction 112 is executed on computing device 110. In other embodiments, smart transaction 112 can be executed on server computer 120 or smart lens 140. In some embodiments, smart transaction 112 can be located and/or executed anywhere within distributed data processing environment 100. In various embodiments, smart transaction 112 can be connected to and communicates with computing device 110, server computer 120 and/or smart lens 140. In various embodiments, smart transaction 112 can store ledger and transaction information on local storage 108, local storage 148, and/or shared storage 124.

In various embodiments, smart transaction 112 enables a user can perform financial transactions with another user based on a detected eye contact event. In various embodiments, smart transaction 112 enables smart lens 140 deployed by two parties (e.g., the sending party and the receiving party) to detect that the each party is making eye contact with the other party (reciprocal eye contact) and determine when the reciprocal eye contact exceeds a predetermined threshold limit of time. In various embodiments, smart transaction 112 enables smart lens 140 to perform facial authentication of another party to initiate financial transaction when a smart lens-based transaction is detected. In some embodiments, a smart lens-based transaction is detected when the smart transaction 112 identifies, via camera component 146, that reciprocal eye contact is achieved for a predetermined amount of time, such as after a 5 second duration.

Additionally, in various embodiments, smart transaction 112 enables the sending party to perform financial transactions with multiple receiving parties present within the sending parties "field of view" or focus angle. In various embodiments, smart transaction 112 can enable smart lens 140 of the sending party to identify a selected "field of view" range and selectively perform financial transaction with multiple people within eye contact. In various embodiments, smart transaction 112 enables the receiving party to receive a financial transaction from multiple sending parties present within the "field of view" of the receiving party. In various embodiments, smart transaction 112 enable smart lens 140 of the receiving party to identify a selected "field of view" range and can selectively receive financial transaction from multiple sending parties within eye contact.

In various embodiments, when any financial transaction is required, the sending party and the receiving party using a smart lens, such as smart lens 140, participate in reciprocal eye contact. For example, smart lens 140 shares the sending party's eye direction and focus angle with the receiving party, wherein the sending party's eye direction and focus angle is displayed on the receiving party's smart lens 140 via an augmented reality component and vice-versa. In various embodiments, once the smart lens determines that another user's focus angle is overlapping with the user's focus angle within a predetermined threshold, then smart transaction 112 considers this an eye contact event (i.e., smart lens-based transaction). An eye contact event is only possible when the focus angles of any two users overlap with each other.

In various embodiments, smart transaction 112 can request that the user confirm the smart lens-based transaction by prompting then user, via augmented reality to select the appropriate financial transaction card by showing a selection of stored credit and debit cards that the user can use for the transaction. In various embodiments, the stored payment/transaction method (e.g., credit card, debit card, linked checking or saving account, files, documents, etc.) can be visually displayed to the user on smart lens 140 and can display the amount of the transaction, and the amount available on the stored credit and debit cards. In various embodiments, smart transaction 112 can enable a user (sending party) to adjust and confirm the transaction amount or select and confirm the correct file or data to share.

In various embodiments, when card is selected, smart transaction 112 can enable electricity that can be transmitted to the coil in the smart lens 140. In various embodiments, once the magnetic field is created around the coil, then the transaction can be initiated using magnetic secure transmission technology. In various embodiments, once reciprocal eye contact is established between the sending party and the receiving party within a predetermined threshold distance, smart transaction 112 can enable smart lens 140 to create a magnetic field to simulate a transaction card and initiate magnetic secure transmission. In various embodiments, while financial transaction is performed, smart transaction 112 can enable smart lens 140 to perform authentication, either by a facial scan of the other party or a retina scan of the wearing party or both and transmit the authenticating data to smart transaction 112. In various embodiments, camera 146 can recognize/identify the user who initiated the transaction.

In various embodiments, smart transaction 112 enables smart lens 140 to identify that an eye contact event between the sending and receiving party is occurring, identify the sending and receiving party, identify that the predetermine threshold distance range between sending and receiving party has been reached (e.g., detecting magnetic signals), identify the predetermined threshold time limit of reciprocal eye contact has been achieved, and initiate the magnetic field in the coil to complete the transaction. In one embodiment, if the user wants to transfer or receive a transaction from multiple people, then the user can alter the "field of view," or focus angle, range within smart lens 140. In this embodiment, the receiving party and the sending party can selectively be identified as making eye contact with the other party, Eye contact directed to a user can be qualified by a predetermined tolerance defined by the user because the "field of view" range in active. When each party is qualified as making eye contact with the other party, the financial transaction will be initiated.

In various embodiments, the "field of view" can be displayed, via augmented reality component, on smart lens so the user can actively see who is in the field of view for a smart lens-based transaction. Lens based-transactions occur inside the users "field of view," in which the user can manually adjust to widen or narrow the "field of view." In some embodiments, smart transaction 112 can enable smart lens 140, via augmented reality component, to highlight or mark identified people or other users in the users "field of view."

In various embodiments, smart transaction 112 can enable a user to perform a smart lens-based transaction with a remote user by using video call, wherein smart lens 140 of at least one party (receiving party and/or sending party) can have eye contact with video screen for a predetermined amount of time to initiate the smart lens-based transaction. In one particular embodiment, for a remote user, present in video call, transaction 112 can identify the eye direction and focus angle on the display screen (i.e., interface 106). Accordingly, smart transaction 112 can identify the object (human face). In this particular embodiment, at the same time, on the receiving side, smart lens 140 can identify the eye direction and focus angle and can determine whether there is eye contact with the remote user in the video screen. In this embodiment, analysis engine finds, both the users are looking at each other from opposite directions (i.e., at each other), then smart transaction 112 identifies that reciprocal eye contact is established between the two users.

For example, the eye direction and focus angle of the sending party includes the image of the receiving party via a web camera, in which smart transaction 112 identifies a smart lens-based transaction through detected reciprocal eye contact between parties, via smart lens 140 and the web camera, and prompts the user, via a visual prompt by the augmented reality component, to confirm a smart lens-based transaction is taking place. In this example, the user confirms a smart lens-based transaction is occurring, in which smart transaction 112 visually prompts the user to confirm the requested amount and select a stored payment method, via the augmented reality component. In this example, the sending party confirms the amount and selects the stored payment method, in which smart transaction 112 executes the smart lens-based transaction by instructing the sending parties cellphone or laptop to complete the transaction and send the receiving party the payment. In various embodiments, smart transaction 112 can enable a user to complete a smart lens-based financial transaction with a point of sale (POS) machine using smart lens 140, wherein the user will be interacting with a camera or specific scanning module of the machine.

In various embodiments, smart transaction 112 can conduct smart lens-based transactions with a POS systems. In various embodiments, smart transaction 112 can initiate a smart lens-based transaction when a user is within a predetermined distance from the POS system sensor and the focus angle overlaps the POS system sensor. In various embodiments, smart transaction 112 detects a smart lens-based transaction when a POS system sensor is in a user's field of view or the eye direction is toward the POS system sensor for a predetermined amount of time. For example, smart transaction 112 determines an offset of eye contact between a user and a POS system sensor meaning the focus angle is not overlapping with the POS system sensor and is unable to initiate a smart lens-based transaction. In this example, for a financial transaction, the focus angle is defined as 5 degrees in the user's peripheral vision by a pre-established contract rule. In this particular example, the transaction will not be executed because the user's focus angle is not lined up (i.e., overlap) with the POS system sensor.

Figure 2:
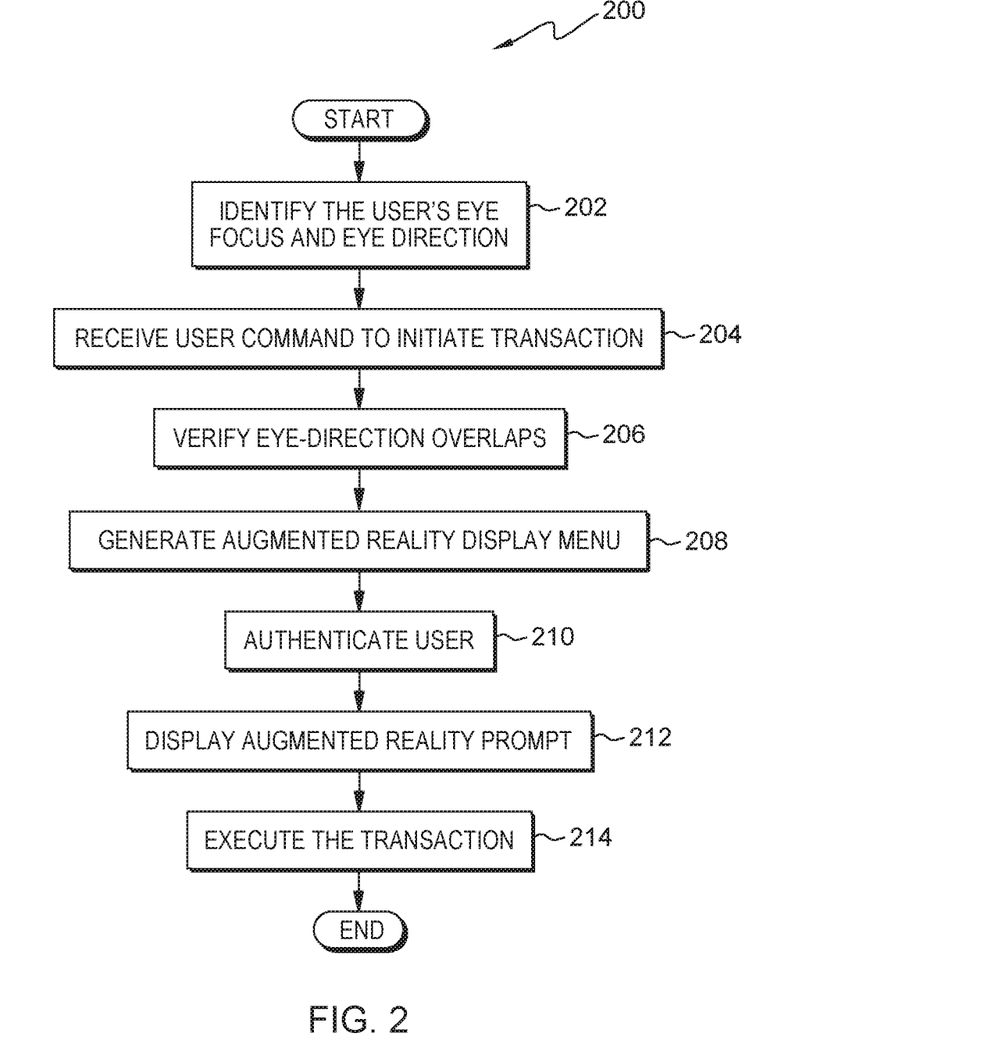
FIG. 2 illustrates operational steps of smart lens transaction component, in communication a computing device within the distributed data processing environment of FIG. 1, for executing a transaction between a sending party and the receiving party, in accordance with an embodiment of the present invention.

FIG. 2 illustrates operational steps of smart transaction 112, generally designated 200, in communication with computing device 110, within distributed data processing environment 100 of FIG. 1, for executing a transaction between a sending party and the receiving party, in accordance with an embodiment of the present invention. FIG. 2 provides an illustration of one implementation and does not imply any limitations with regard to the environments in which different embodiments can be implemented. Many modifications to the depicted environment can be made by those skilled in the art without departing from the scope of the invention as recited by the claims.

In step 202, smart transaction 112 identifies the eye focus, the focus angle, and/or the eye direction. In various embodiments, smart transaction 112 can identify the eye focus and the eye direction via components on smart lens 140. In various embodiments, smart transaction 112 enables smart lens 140 to identify other users or POS sensors in the users focus angle, or "field of view."

In step 204, smart transaction 112 receives user command to initiate a smart lens-based transaction. In various embodiments, smart transaction 112 can receive a user command to initiate a smart lens-based transaction either from the sending party or the receiving party. For example, a user can initiate a command, via an augmented reality user interface on smart lens 140 to pay a second user (the receiving party) or a user can receive a payment request from the receiving party. In other examples, a user can user computing device 110 to send user commands to initiate smart lens-based transactions. In one particular embodiment, smart transaction 112 can identify a smart lens-based transaction based on the identified eye direction and/or focus angle of the user, wherein smart transaction 112 displays a responsive augmented reality prompt on the user's smart lens 140 that queries the user to initiate a smart lens-based transaction. In this particular embodiment, the user can respond to the prompt by selecting to initiate or to cancel the smart lens-based transaction. In this particular embodiment, if the user selects to initiate the smart lens-based transaction then smart transaction 112 receives the command to initiate the smart lens-based transaction from the user; however, if the user selects to cancel the smart lens-based transaction then smart transaction 112 terminates the smart lens-based transaction.

In step 206, smart transaction 112 verifies that the focus angles of the sending party and the receiving party overlap, meaning that the two parties are looking at each other, at least within a pre-defined field of view. In various embodiments, smart transaction 112 can verify that the eye-direction between the sending party and the receiving party overlap using the gaze point tracker to identify a user's focus direction, focal length tracker, and compass component on smart lens 140. In various embodiments, when a user focusses in a particular direction, then the compass component, gaze point tracker, and focal length tracker can identify where the user is looking.

In various embodiments, smart transaction 112 can display a user's eye direction, eye focus, and "field of view" to another user, via smart lens 140, in which each user can see the other user's eye direction, eye focus, and "field of view" in addition to their own eye direction, eye focus, and "field of view" on smart lens 140. In various embodiments, smart transaction 112 can verify that two or more users' eye-directions overlap. In various embodiments, smart transaction 112 can display a responsive augmented reality prompt to the sending party, via smart lens 140, in which the responsive prompt queries the user to select a stored payment method and confirm the amount being sent or requested. In other embodiments, the sending party is quired to select or confirm the file or data that is requested or being sent to the receiving party.

In step 208, smart transaction 112 generates an augmented reality display menu. In various embodiments, smart transaction 112 can generate an augmented reality display menu that displays a responsive prompts on smart lens 140. The display menu enables the user to edit a user profile, edit stored transaction methods, adjust focus angle, enable or disable smart lens-based transaction, etc. In various embodiments, smart transaction 112 can display an augmented reality prompt in smart lens 140 when a smart lens-based transaction is identified based on the users "field of view," eye focus, and eye direction. A smart lens-based transaction is identified when a first user makes eye contact with another user for a predetermined amount of time within a predetermined range.

In step 210, smart transaction 112 authenticates the user. In various embodiments, smart transaction 112 can authenticate a user when a smart lens-based transaction is identified. In various embodiments, smart transaction 112 can authenticate a user using biometric measurements measured by smart lens 140 (e.g., retinal scanning) as it is known in the art or via computing device 110.

In step 212, smart transaction 112 displays augmented reality prompts. In various embodiments, smart transaction 112 can displays one or more responsive prompts on smart lens 140. In various embodiments, smart transaction 112 can display an augmented reality prompt in smart lens 140 when a smart lens-based transaction is identified based on the users "field of view," eye focus, and eye direction. A smart lens-based transaction is identified when a first user makes eye contact with another user for a predetermined amount of time within a predetermined range. In various embodiments, smart transaction 112 displays stored payment/transaction method (e.g., credit card, debit card, linked checking or saving account, files, documents, etc.), wherein the stored payment/transaction methods are visually displayed to the user on smart lens 140. In various embodiments, smart transaction 112 can display the amount of the transaction, and the amount available on the stored credit and debit cards to the user on smart lens 140. In various embodiments, smart transaction 112 can enable a user (sending party) to adjust and confirm the transaction amount or select and confirm the correct file or data to share.

In step 214, smart transaction 112 executes the transaction between the sending party and the receiving party. In various embodiments, smart transaction 112 can execute the transaction between two parties after the receiving party confirms the payment amount or data/file to transfer. In various embodiments, smart transaction 112 can enable the magnetic coil to generate an appropriate magnetic field with MTS technology to execute the smart lens-based transaction.

Figure 3:
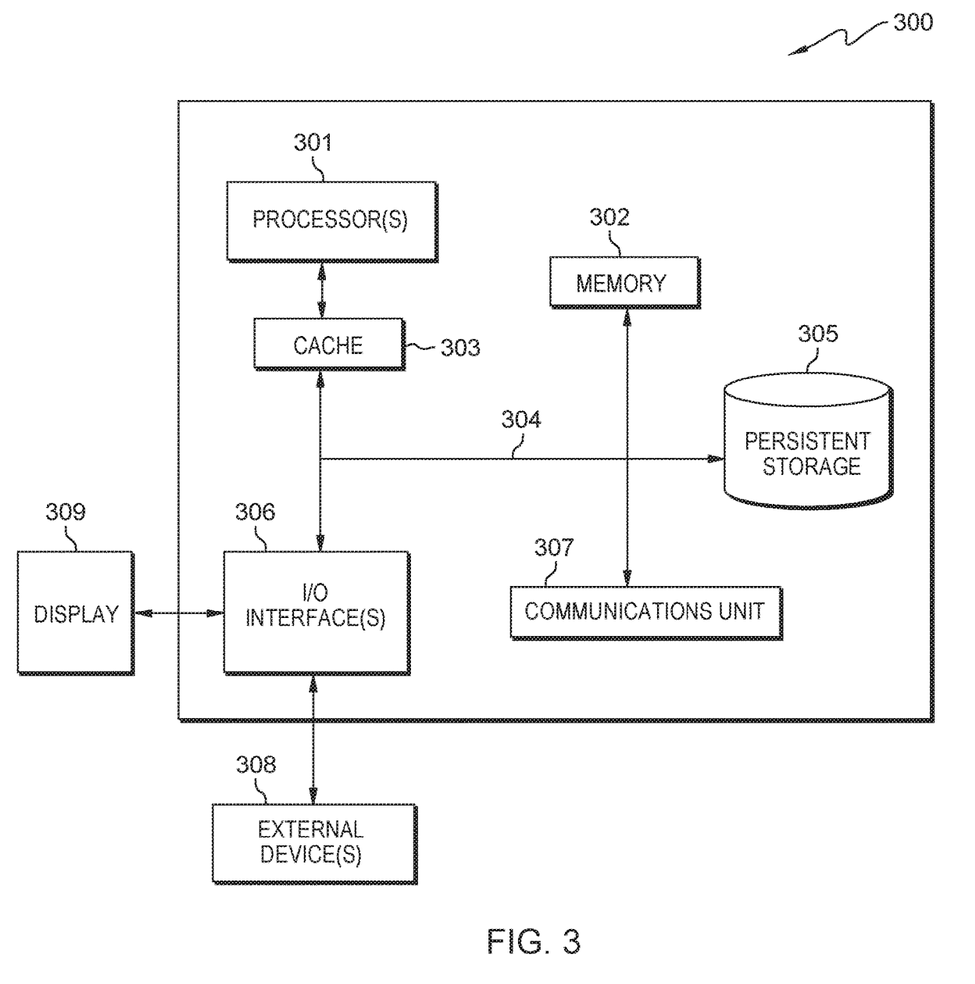
FIG. 3 depicts a block diagram of components of a computing device executing the smart lens transaction component within the distributed data processing environment of FIG. 1, in accordance with an embodiment of the present invention.

FIG. 3 depicts computer system 300, where computing device 110 represents an example of computer system 300 that includes smart transaction 112. The computer system includes processors 301, cache 303, memory 302, persistent storage 305, communications unit 307, input/output (I/O) interface(s) 306, display 309, external device(s) 308 and communications fabric 304. Communications fabric 304 provides communications between cache 303, memory 302, persistent storage 305, communications unit 307, and input/output (I/O) interface(s) 306. Communications fabric 304 can be implemented with any architecture designed for passing data and/or control information between processors (such as microprocessors, communications, and network processors, etc.), system memory, peripheral devices, and any other hardware components within a system. For example, communications fabric 304 can be implemented with one or more buses or a crossbar switch.

Memory 302 and persistent storage 305 are computer readable storage media. In this embodiment, memory 302 includes random access memory (RAM). In general, memory 302 can include any suitable volatile or non-volatile computer readable storage media. Cache 303 is a fast memory that enhances the performance of processors 301 by holding recently accessed data, and data near recently accessed data, from memory 302.

Program instructions and data used to practice embodiments of the present invention can be stored in persistent storage 305 and in memory 302 for execution by one or more of the respective processors 301 via cache 303. In an embodiment, persistent storage 305 includes a magnetic hard disk drive. Alternatively, or in addition to a magnetic hard disk drive, persistent storage 305 can include a solid-state hard drive, a semiconductor storage device, read-only memory (ROM), erasable programmable read-only memory (EPROM), flash memory, or any other computer readable storage media that is capable of storing program instructions or digital information.

The media used by persistent storage 305 can also be removable. For example, a removable hard drive can be used for persistent storage 305. Other examples include optical and magnetic disks, thumb drives, and smart cards that are inserted into a drive for transfer onto another computer readable storage medium that is also part of persistent storage 305.

Communications unit 307, in these examples, provides for communications with other data processing systems or devices. In these examples, communications unit 307 includes one or more network interface cards. Communications unit 307 can provide communications through the use of either or both physical and wireless communications links. Program instructions and data used to practice embodiments of the present invention can be downloaded to persistent storage 305 through communications unit 307.

I/O interface(s) 306 enables for input and output of data with other devices that can be connected to each computer system. For example, I/O interface 306 can provide a connection to external devices 308 such as a keyboard, keypad, a touch screen, and/or some other suitable input device. External devices 308 can also include portable computer readable storage media such as, for example, thumb drives, portable optical or magnetic disks, and memory cards. Software and data used to practice embodiments of the present invention can be stored on such portable computer readable storage media and can be loaded onto persistent storage 305 via I/O interface(s) 306. I/O interface(s) 306 also connect to display 309.

Display 309 provides a mechanism to display data to a user and can be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention can be a system, a method, and/or a computer program product. The computer program product can include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, a segment, or a portion of instructions, which comprises one or more executable instructions for implementing the specified logical function(s). In some alternative implementations, the functions noted in the blocks can occur out of the order noted in the Figures. For example, two blocks shown in succession may, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for smart lens-based transactions using eye contact, the method comprising:
   identifying, by a tracker component, a focus angle of a user wearing a smart lens, wherein the focus angle is a predefined angle from a gaze point of the user;
   determining, by the smart lens, a smart lens-based transaction is occurring based on the focus angle including a second user or a point of sale sensor for a predetermined amount of time;
   verifying, by a gaze point tracker, the focus angle overlaps with a transacting focus angle of the second user or the point of sale sensor;
   authenticating, by the smart lens, the user through biometric security measures on the smart lens;
   performing the smart lens-based transaction with a remote user through a video call, wherein performing the smart lens-based transaction with the remote user comprises:
      initiating the smart lens-based transaction with the remote user, wherein at least one user is wearing a smart lens and makes eye contact with a video screen for a predetermined amount of time;
   identifying the at least one user wearing the smart lens eye focus and eye direction on the video screen;
   identifying eye direction and eye focus of the remote user on the video screen;
   establishing, by the smart lens, eye contact between the at least one user wearing the smart lens and the remote user by determining that the at least one user wearing the smart lens and the remote user are looking in opposite directions;
   confirming, by the smart lens, the smart lens-based transaction is occurring wherein confirming the smart lens-based transaction is occurring comprises:
      visually prompting, by an augmented reality component, the remote user to confirm the requested amount and select a stored payment method, via the augmented reality component;
   executing, by a magnetic coil, the smart lens-based transaction based on one or more verified overlapping focus angles and a user confirmation, wherein the magnetic coil generates an appropriate magnetic field with magnetic secure transmission (MST) technology to execute the smart lens-based transaction, wherein the magnetic coil is aligned with the focus direction of the user;
   responsive to receiving confirmation that the smart lens-based transaction is occurring, generating one or more augmented reality responsive prompts that prompt the remote user to confirm a requested amount or file and select a stored payment method;
   responsive to receiving confirmation of the correct amount or correct file, executing the smart lens-based transaction by instructing the computing device to complete the transaction by releasing the request amount or file; and
   displaying, by an augmented reality component on the smart lens, an augmented reality prompt to the user through the smart lens, wherein the augmented reality prompt on the smart lens prompts the user to select a stored payment method and confirm an amount or file associated with the smart lens-based computing event.

2. The method of claim 1 further comprising:
   receiving a user command to initiate the smart lens-based transaction either from a sending party or a receiving party.

3. The method of claim 1 further comprising:
   authenticating the at least one user and the remote user associated with the smart lens-based transaction using a respective smart lens of the at least one user and the remote user respectively.

4. A computer program product for smart lens-based transactions using eye contact, the computer program product comprising:
   one or more computer readable storage medium and program instructions stored on the one or more computer readable storage medium, wherein the computer readable storage medium is not a transitory signal per se, the stored program instructions comprising:
      program instructions to identify, by a tracker component, a focus angle of a user wearing a smart lens, wherein the focus angle is a predefined angle from a gaze point of the user;
      program instructions to determine, by the smart lens, a smart lens-based transaction is occurring based on the focus angle including a second user or a point of sale sensor for a predetermined amount of time;

program instructions to verify, by a gaze point tracker, the focus angle overlaps with a transacting focus angle of the second user or the point of sale sensor;

program instructions to authenticate, by the smart lens, the user through biometric security measures on the smart lens;

program instructions to perform the smart lens-based transaction with a remote user through a video call, wherein performing the smart lens-based transaction with the remote user comprises:

program instructions to initiate the smart lens-based transaction with the remote user, wherein at least one user is wearing a smart lens and makes eye contact with a video screen for a predetermined amount of time program instructions to identify the at least one user wearing the smart lens eye focus and eye direction on the video screen;

program instructions to identify eye direction and eye focus of the remote user on the video screen;

program instructions to establish, by the smart lens, eye contact between the at least one user wearing the smart lens and the remote user by determining that the at least one user wearing the smart lens and the remote user are looking in opposite directions;

program instructions to confirm, by the smart lens, the smart lens-based transaction is occurring wherein confirming the smart lens-based transaction is occurring comprises:

program instructions to visually prompt, by an augmented reality component, the remote user to confirm the requested amount and select a stored payment method, via the augmented reality component;

program instructions to execute, by a magnetic coil, the smart lens-based transaction based on one or more verified overlapping focus angles and a user confirmation, wherein the magnetic coil generates an appropriate magnetic field with magnetic secure transmission (MST) technology to execute the smart lens-based transaction, wherein the magnetic coil is aligned with the focus direction of the user;

responsive to receiving confirmation that the smart lens-based transaction is occurring, program instructions to generate one or more augmented reality responsive prompts that prompt the remote user to confirm a requested amount or file and select a stored payment method;

responsive to receiving confirmation of the correct amount or correct file, program instructions to execute the smart lens-based transaction by instructing the computing device to complete the transaction by releasing the request amount or file;

program instructions to display, by an augmented reality component on the smart lens, an augmented reality prompt to the user through the smart lens, wherein the augmented reality prompt on the smart lens prompts the user to select a stored payment method and confirm an amount or file associated with the smart lens-based computing event.

5. The computer program product of claim 4 further comprising:

program instructions to receive a user command to initiate the smart lens-based transaction either from a sending party or a receiving party.

6. The computer program product of claim 4 further comprising:

program instructions to authenticate the at least one user and the remote user associated with the smart lens-based transaction using a respective smart lens of the at least one user and the remote user respectively.

7. A computer system for crowdsource recording and sharing of media files, the computer system comprising:

one or more computer processors;

one or more computer readable storage devices;

program instructions stored on the one or more computer readable storage devices for execution by at least one of the one or more computer processors, the stored program instructions comprising:

program instructions to identify, by a tracker component, a focus angle of a user wearing a smart lens, wherein the focus angle is a predefined angle from a gaze point of the user;

program instructions to determine, by the smart lens, a smart lens-based transaction is occurring based on the focus angle including a second user or a point of sale sensor for a predetermined amount of time;

program instructions to verify, by a gaze point tracker, the focus angle overlaps with a transacting focus angle of the second user or the point of sale sensor;

program instructions to authenticate, by the smart lens, the user through biometric security measures on the smart lens;

program instructions to perform the smart lens-based transaction with a remote user through a video call, wherein performing the smart lens-based transaction with the remote user comprises:

program instructions to initiate the smart lens-based transaction with the remote user, wherein at least one user is wearing a smart lens and makes eye contact with a video screen for a predetermined amount of time;

program instructions to identify the at least one user wearing the smart lens eye focus and eye direction on the video screen;

program instructions to identify eye direction and eye focus of the remote user on the video screen;

program instructions to establish, by the smart lens, eye contact between the at least one user wearing the smart lens and the remote user by determining that the at least one user wearing the smart lens and the remote user are looking in opposite directions;

program instructions to confirm, by the smart lens, the smart lens-based transaction is occurring wherein confirming the smart lens-based transaction is occurring comprises:

program instructions to visually prompt, by an augmented reality component, the remote user to confirm the requested amount and select a stored payment method, via the augmented reality component;

program instructions to execute, by a magnetic coil, the smart lens-based transaction based on one or more verified overlapping focus angles and a user confirmation, wherein the magnetic coil generates an appropriate magnetic field with magnetic secure transmission (MST) technology to execute the smart lens-based transaction, wherein the magnetic coil is aligned with the focus direction of the user;

responsive to receiving confirmation that the smart lens-based transaction is occurring, program instructions to generate one or more augmented reality responsive prompts that prompt the remote user to confirm a requested amount or file and select a stored payment method;

responsive to receiving confirmation of the correct amount or correct file, program instructions to execute the smart lens-based transaction by instructing the computing device to complete the transaction by releasing the request amount or file;

program instructions to display, by an augmented reality component on the smart lens, an augmented reality prompt to the user through the smart lens, wherein the augmented reality prompt on the smart lens prompts the user to select a stored payment method and confirm an amount or file associated with the smart lens-based computing event.

8. The computer system of claim 7 further comprising:
program instructions to receive a user command to initiate the smart lens-based transaction either from a sending party or a receiving party.

9. The computer system of claim 7 further comprising:
program instructions to authenticate the at least one user and the remote user associated with the smart lens-based transaction using a respective smart lens of the at least one user and the remote user respectively.

* * * * *